United States Patent [19]
Nakagawa et al.

[11] Patent Number: 5,174,432
[45] Date of Patent: Dec. 29, 1992

[54] TRAY CONVEYOR APPARATUS

[75] Inventors: Osamu Nakagawa, Kyoto; Takashi Nakagawa, Uji, both of Japan

[73] Assignee: Murata Kikai Kabushiki Kaisha, Kyoto, Japan

[21] Appl. No.: 817,724

[22] Filed: Jan. 7, 1992

[30] Foreign Application Priority Data

Jan. 18, 1991 [JP] Japan .................... 3-4592[U]

[51] Int. Cl.⁵ .................................. B65G 29/00
[52] U.S. Cl. ..................... 198/465.1; 198/803.01
[58] Field of Search ........... 198/465.1, 803.01, 803.12; 242/35.5 A

[56] References Cited

U.S. PATENT DOCUMENTS

| | | | |
|---|---|---|---|
| 4,781,287 | 11/1988 | Fukushima | 198/803.01 |
| 4,784,255 | 11/1988 | Uchida | 198/803.01 X |
| 5,011,000 | 4/1991 | Kawasaki et al. | 198/465.1 |
| 5,074,401 | 12/1991 | Mosita et al. | 198/803.01 X |
| 5,088,591 | 2/1992 | Grecksch et al. | 198/465.1 |

FOREIGN PATENT DOCUMENTS

| | | | |
|---|---|---|---|
| 0314089 | 5/1989 | European Pat. Off. | 198/465.1 |
| 2603165 | 7/1976 | Fed. Rep. of Germany | 198/803.12 |
| 2191304 | 8/1987 | Japan | 198/803.01 |
| 0035732 | 7/1988 | Japan | 198/803.01 |
| 2-175934 | 7/1990 | Japan | 198/803.12 |

Primary Examiner—Robert P. Olszewski
Assistant Examiner—James R. Bidwell
Attorney, Agent, or Firm—Spensley, Horn, Jubas & Lubitz

[57] ABSTRACT

A tray conveyor apparatus for conveying a bobbin loaded on a tray while tilting the axis of the tray from a vertical position to a horizontal position and vice versa, having a first guide for guiding the neck of the tray off a support body which supports the bottom face of the base of the tray near a tilting point and a second guide for guiding the base of the tray between the first guide and the support body. The bobbin being carried on the conveyor of the aforesaid constitution is tilted by a curved guide while being guided at the base of the peg tray and at the neck supporting the bobbin and being supported by the support body. On the underground runway, therefore, the bobbin travels in the horizontal state.

6 Claims, 3 Drawing Sheets

TRAY CONVEYOR APPARATUS

BACKGROUND OF THE INVENTION

1. Field of the Invention

This invention relates to a conveyor apparatus for conveying spinning bobbins through an underground runway located between an automatic winder and a spinning frame.

2. Prior Art

In this conventional type of conveyor apparatus, when a spinning bobbin 52 wound with spun yarn from a spinning frame 51 is carried on a conveyor 53, there is used a tray 55 having a peg 54 erected thereon, on which a spinning bobbin 52 is inserted. The tray 55 supporting the bobbin is conveyed on a conveyor belt 58 arranged below while being guided at its neck 50 along a guide plate 57 having a guide groove 56.

The spinning bobbin 52, when conveyed to the automatic winder 59, is led downwardly by means of a curved guide 61 for passing the bobbin beneath a passage 60, transporting along an underground runway 62 formed below the passage 60. When the underside of the tray 55 is pushed by a rod 64 actuated by an intermittent feed mechanism 63, the spinning bobbin being guided along a curved guide 65 is pushed upward, then being conveyed on a conveyor belt 66 of the automatic winder 49. The empty bobbin unwound at the automatic winder 59 is returned to the spinning frame through similar conveyor means.

The conventional underground conveyor apparatus described above can not be curved with a small curvature radius because of restrictions on the winding diameter of the spinning bobbin and on the curvature of the curved guide 61. Accordingly it is impossible to decrease the spacing L between the end of the passage 60 and the spinning frame 51 and between the other end of the passage 60 and the automatic winder 59.

The conveyor apparatus, therefore, has such a drawback that a dead space between the spinning frame and the automatic winder in a factory increases. In addition, there exists such a drawback that the depth H of the underground runway 62 requires a substantial increase because of a necessity for the height of the bobbin and for a mounting space for the intermittent feed mechanism 63 which pushes the bottom face of the tray 55, resulting in an increased cost of construction.

SUMMARY OF THE INVENTION

The present invention, therefore, has been accomplished in an attempt to obviate the above-mentioned drawbacks of the conventional conveyor apparatus, and has an object to provide a tray conveyor apparatus for carrying bobbins while tilting the axis of the trays mounted with the bobbins. The conveyor apparatus of the present invention is provided with the first guide for guiding the tray by the neck thereof off the support body supporting the base bottom face of the tray near the tilt point and the second guide for guiding the base of the tray between the first guide and the support body. The axis of the tray is tilted from the vertical position to the horizontal position while the tray is being conveyed, in order to decrease the dead space in the factory and to lower the cost of formation of the underground runway.

Since the tray conveyor apparatus of this invention is so constituted as described above, the bobbin is carried on the conveyor while being guided in a tilted state by a curved guide while being supported at the outer periphery of the base of the peg tray and the outer periphery of the neck supporting the bobbin. On the underground runway the trays, accordingly the bobbins also, are conveyed in a level position.

DETAILED DESCRIPTION OF THE DRAWINGS

DETAILED DESCRIPTION OF PREFERRED EMBODIMENT

Figure 1:
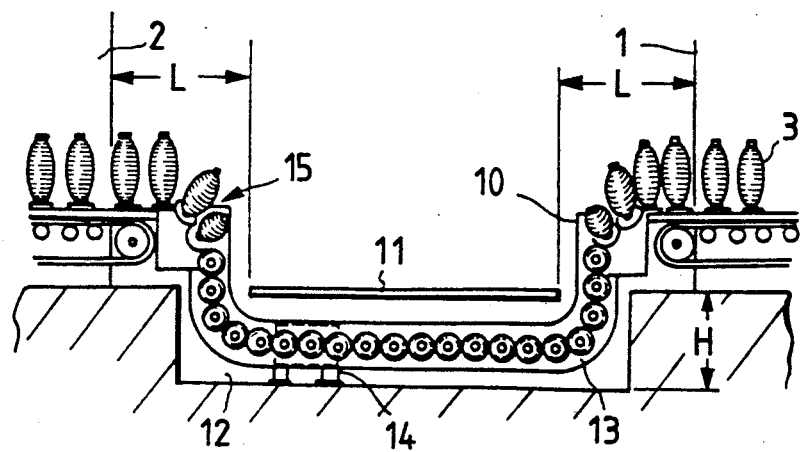
FIG. 1 is a side view showing the general constitution of a conveyor apparatus embodying the present invention.

Hereinafter an exemplary embodiment of a tray conveyor apparatus according to this invention will be described with reference to the accompanying drawings.

In FIGS. 1 to 4 spinning bobbins 3 carried from a spinning frame 1 to an automatic winder 2 are inserted upright each over a peg 5 of a tray 4, and are conveyed on a belt conveyor 8 while being guided at the bottom face by a guide plate 7 having a first guide groove defined by edges 6 and 6'.

The spinning bobbins 3 being carried are tilted by a twist conveyor 10 described later, being sent underground by a curved guide 13 for sending the bobbins to an underground runway 12 formed beneath a passage 11. The spinning bobbins 3 are pushed out one after another by means of an intermittent feed mechanism 14 which operates the bottom section of the bobbin-loaded tray 4 tilted to the horizontal position on the underground runway 12, going upward along the curved guide 13 and then, after being twisted back again to the upright position by a twist conveyor 15, being sent to a conveyor of the automatic winder 2.

Figure 2:
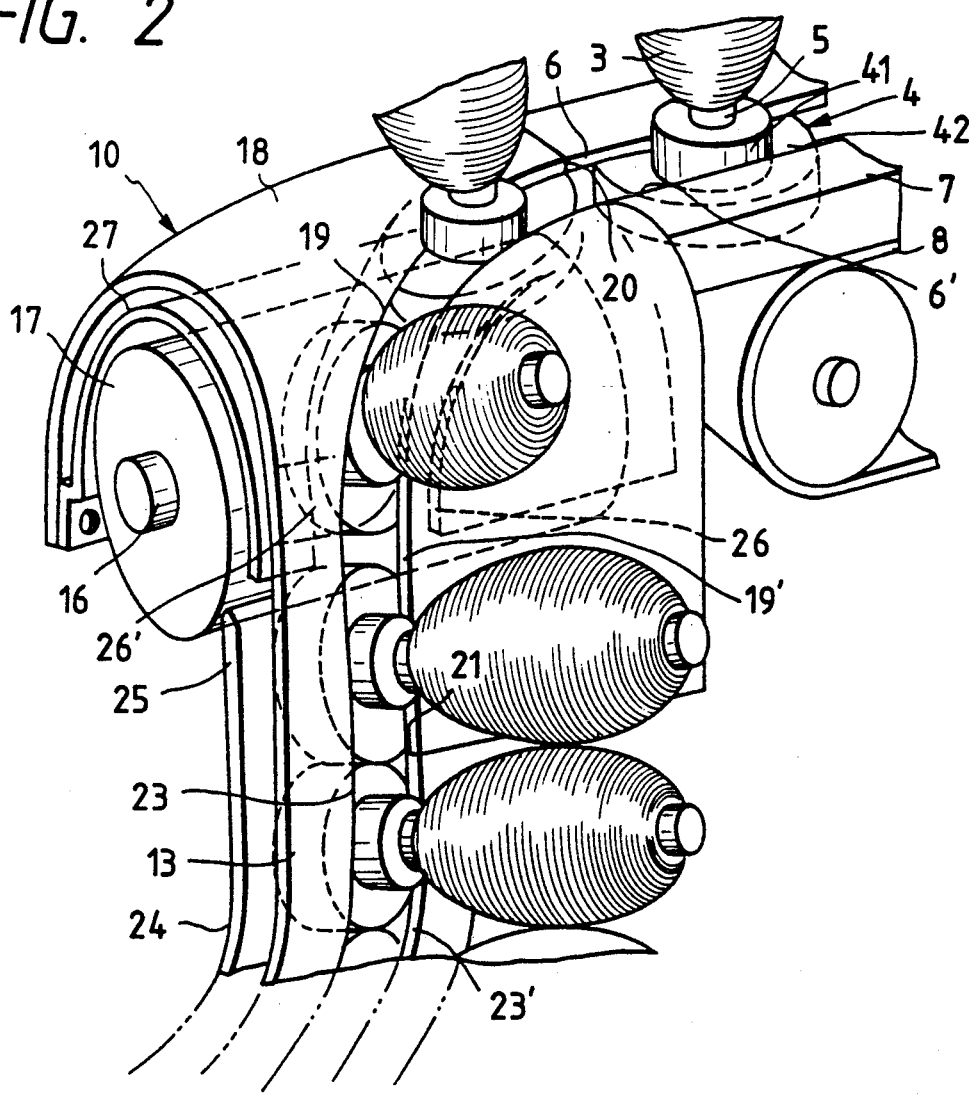
FIG. 2 is a perspective view of a twist conveyor section embodying the present invention.
Figure 3:
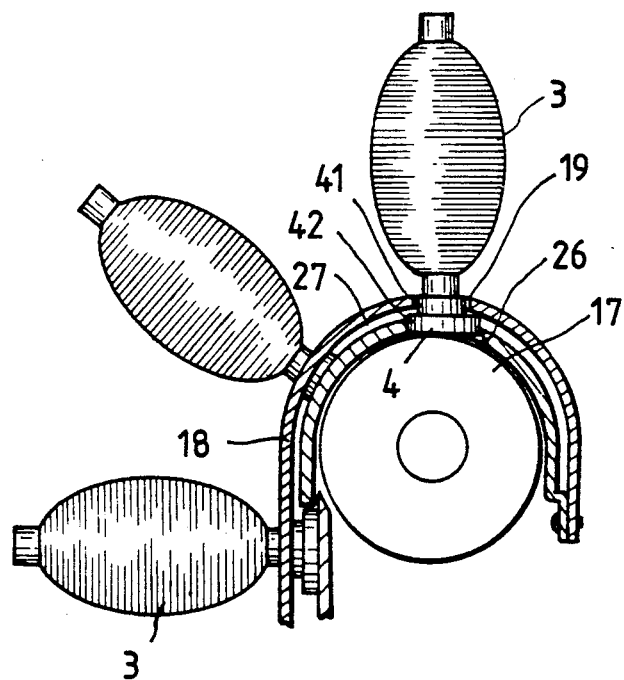
FIG. 3 is a sectional view of the conveyor apparatus embodiyng the present invention.
Figure 4:
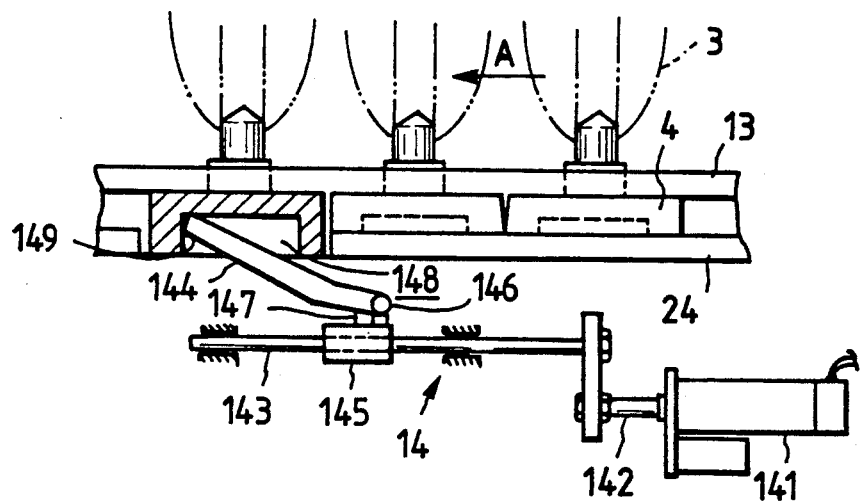
FIG. 4 is a plan view showing an intermittent feed mechanism embodying the present invention.
Figure 5:
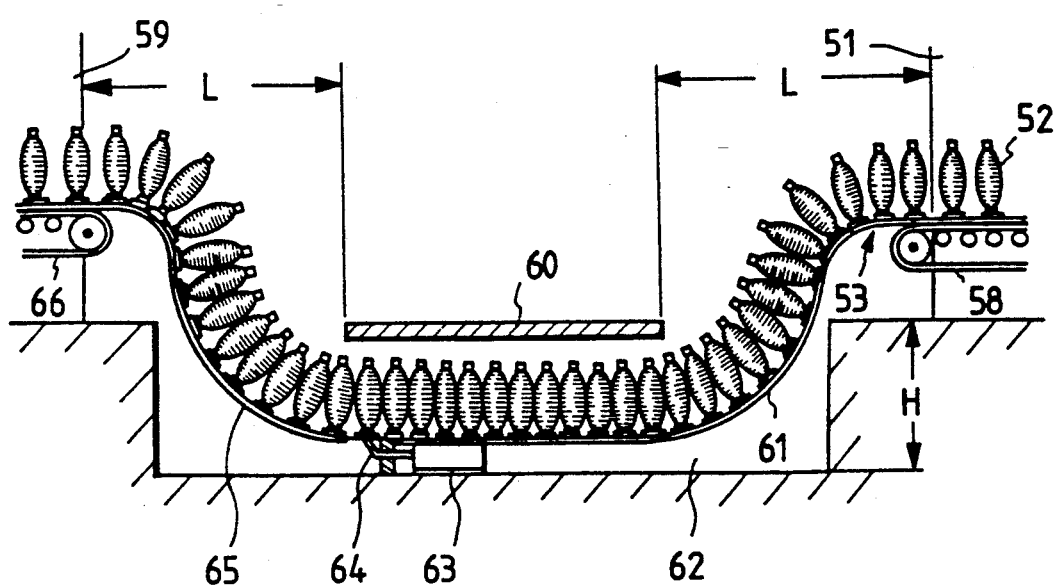
FIG. 5 is a side view showing the entire constitution of a conventional conveyor apparatus.
Figure 6:
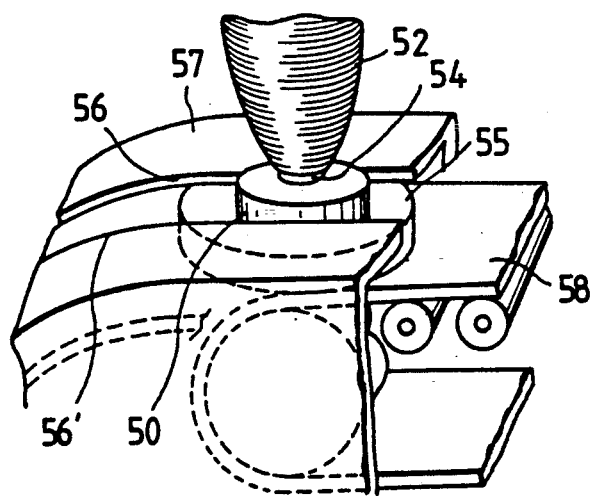
FIG. 6 is a perspective view showing a partly sectioned conventional guide groove section.

The twist conveyor 10 has a roller 17 rotatable on the center of an axis 16 as shown in FIG. 2, and is covered with a guide cover 18 mounted off the outer periphery of the roller. The guide cover 18 is provided with a second guide groove defined by edges 19 and 19', the end 20 of which is aligned with the end of the first guide groove of the guide plate 7, and further the direction of the second guide groove at the end thereof coincides with the direction of the axis of the roller 17. The second guide groove defined by the edges 19 and 19' is gradually bent tangentially, with its end 21 being aligned with that of a third guide groove defined by edges 23 and 23' provided in the curved guide 13. A first guide is formed as described above for the purpose of guiding the outer periphery of the neck 41 supporting the bobbin on the tray 4 running along the first, second and third guide grooves.

On the other hand, a spacing provided between the outer periphery of the roller 17 and the guide cover 18 is set larger than the thickness of the tray 4, and further the roller 17 is so arranged that the top edge of its outer periphery may be flush with the upper surface of the belt conveyor 8, thereby allowing the smooth transfer of the tray 4 of the spinning bobbin 3 from the belt conveyor 8 onto the outer periphery of the roller 17.

Beneath the curved guide 13 at the exit section of the twist conveyor 10 is installed a curved support plate 24 with a specific spacing. The end section 25 thereof is so formed as to allow smooth transfer of the trays of the spinning bobbins 3 from the roller 17 over to the curved support plate 24.

Installed in this guide cover 18 is an intermediate guide plate 27. This intermediate guide plate 27 has a second guide consisting of a guide groove defined by edges 26 and 26' for guiding the outer periphery of the base 42 of the tray 4. The guide groove defined by the edges 26 and 26' conform to the shape of the second guide groove defined by the edges 19 and 19' of the guide cover 18.

The intermittent feed mechanism 14 may be composed of a fluid cylinder 141 which expands and contracts along the direction of conveyance A, a sliding rod 143 coupled with a piston rod 142, and a push lever 144 supported by the sliding rod 143 and engaged with the tray 4. The push lever 144 is rotatably supported on a vertical shaft 146 through a support body 145 mounted on the sliding rod 143, extended obliquely upward in the direction of conveyance A, and projected toward the curved guide 13 and the curved support plate 24. On the support body 145 is installed a spring 147 pushing the push lever 144 upward.

The push lever 144 is so designed that its forward end can enter a cavity 148 defined in the bottom section of the tray 4. That is, the push lever 144 pushes the inner wall 149 of the cavity 148 when the fluid cylinder 141 extends in the direction of conveyance A, and reversely moves away from the cavity 148 as it is pressed with the bottom of the tray 4. Also, the push lever 144 comes into engagement with the next tray 4 following in the direction of conveyance of the trays 4, then being guided by the curved guide 13 and the curved support plate 24 to carry the bobbin 3.

It should be noted that the intermittent feed mechanism 14 of this invention is not limited to the constitution explained above and any arbitrary constitution, if of a known means, may be used.

In the tray conveyor apparatus of the aforementioned constitution, the spinning bobbin 3 formed at the spinning frame 1 is carried on the belt conveyor 8 while being guided along the first guide groove defined by the edges 6 and 6' of the guide plate 7, being sent to the twist conveyor 10. At the entrance of this twist conveyor 10, the tray loaded with a spinning bobbin is pushed in the direction of the axis of the roller 17, with its neck 41 being guided by the first guide groove and at the same time with the outer periphery of the base 42 of the tray being guided by the second guide while the lower surface of the tray is supported in line contact with the roller 17.

The guide groove defined by the edges 26 and 26' of the second guide may be used to guide the trays in the direction of conveyance by providing the second guide groove defined by the edges 19 and 19' with a substantially large spacing for smooth tray conveyance. In this case the trays can smoothly be guided by the guide groove defined by the edges 26 and 26' of the second guide if the entire body of the neck of the tray dips in a large spacing of the second guide grooves provided because of the use of a small roller 17 for purpose of effective utilization of the spacing.

The entrance and exit of the twist conveyor 15 on the automatic winder side differ from those of the twist conveyor 10 described above. The roller may be a curved plate-like support body. Further, the guide groove 19 may be curved at the exit in the direction of the axis of the roller as indicated by a chain line in FIG. 2.

The guide of the present invention will be an effective means of guiding when a support tray is supported and conveyed on a round belt or a flat belt.

According to the tray conveyor apparatus of this invention of the above-described constitution and function, bobbins in a tilted state interfere little with each other and accordingly will never be limited by their contact in the twisted area of the conveyor; it is, therefore, possible to form the guide grooves of an extremely small curvature radius, thereby enabling a decrease in the distance L between the end of the passage and the spinning frame and the other end of the passage and the automatic winder and a decrease in the dead space in the factory. Particularly since there is installed a second guide between the guide plate and the support body so as to guide the outer periphery of the base of the tray, the tray can be smoothly guided and conveyed on the conveyor having support bodies of especially small diameter even when the entire body of the neck of the tray dips in the first guide of the guide plate.

The tray, being in line contact at the bottom face with the conveyor, travels smoothly, can travel much more smoothly by freely rotating the support body as a free roller. Further, since the tray support member of the twist area requires no complicated working for forming a prescribed curved member, the tray support section can be formed of simple constitution only by the arrangement of rollers.

On the other hand, the intermittent feed mechanism for feeding spinning bobbins upward from the underground runway needs no increase in the depth of the underground runway because the tray tilts until its bottom section is vertical, and also since the bobbins travel horizontally, a deep runway is not required, accordingly resulting in a low construction cost.

What is claimed is:

1. An apparatus for conveying a tray loaded with a bobbin, the tray comprising a base and a neck, the neck having an outer periphery and the base having an outer periphery, the apparatus comprising:
    a support body defining a tilting site at which the tray is tilted from a substantially vertical orientation to a substantially horizontal orientation,
    first guide means for guiding the outer periphery of the neck of the tray in the vicinity of the tilting site, and
    second guide means in spaced relationship with the first guide means and with the support body for guiding the outer periphery of the base of the tray in the vicinity of the tilting site.

2. The apparatus as claimed in claim 1, wherein the support body comprises a rotatable roller and further comprising a twist conveyor in spaced relationship with the rotatable roller.

3. The apparatus as claimed in claim 2, further comprising a spinning frame including a belt conveyor having an upper surface, wherein the roller defines an outer periphery having a top edge and wherein the top edge of the outer periphery of the roller is substantially flush with the upper surface of the belt conveyor.

4. The apparatus as claimed in claim 2, wherein the first guide means comprises:
- a guide plate in spaced relationship with the belt conveyor, the guide plate defining a first guide groove,
- a guide cover in spaced relationship with the outer periphery of the roller, the guide cover defining a second guide groove, and
- a curved guide defining a third guide groove, and wherein the second guide means comprises
- an intermediate guide plate disposed between the roller and the guide cover, the intermediate guide plate defining an intermediate guide groove, the intermediate guide groove and the second guide groove being substantially similar in shape.

5. The apparatus as claimed in claim 4, wherein the twist conveyor defines an exit section, further comprising
- a curved support plate adjacent the exit section of the twist conveyor and in spaced relationship with the curved guide,
- whereby the tray is transferred from the roller onto the curved support plate.

6. The apparatus as claimed in claim 5, comprising
- an intermittent feed mechanism positioned substantially adjacent to the curved support plate for pushing the tray exiting from the curved support plate.

* * * * *